United States Patent
York

(10) Patent No.: US 10,184,604 B1
(45) Date of Patent: Jan. 22, 2019

(54) EQUALIZER MANIFOLD SYSTEM AND METHOD OF USE

(71) Applicant: Howard Russell York, Arlington, TX (US)

(72) Inventor: Howard Russell York, Arlington, TX (US)

( * ) Notice: Subject to any disclaimer, the term of this patent is extended or adjusted under 35 U.S.C. 154(b) by 0 days.

(21) Appl. No.: 15/288,872

(22) Filed: Oct. 7, 2016

Related U.S. Application Data

(60) Provisional application No. 62/238,312, filed on Oct. 7, 2015.

(51) Int. Cl.
*F15C 1/16* (2006.01)
*F16L 41/02* (2006.01)
*F15D 1/02* (2006.01)
*F16K 47/08* (2006.01)

(52) U.S. Cl.
CPC ............... *F16L 41/02* (2013.01); *F15D 1/02* (2013.01); *F16K 47/08* (2013.01); *Y10T 137/212* (2015.04); *Y10T 137/2273* (2015.04); *Y10T 137/479* (2015.04); *Y10T 137/87885* (2015.04)

(58) Field of Classification Search
CPC .. F16K 47/02; F16K 7/08; F16K 47/10; F16L 41/02
USPC .... 137/834, 842, 808, 262, 884; 239/58, 34; 285/125.1
See application file for complete search history.

(56) References Cited

U.S. PATENT DOCUMENTS

| | | | | |
|---|---|---|---|---|
| 2,099,186 A | * | 11/1937 | Anderegg | F25B 39/028 165/110 |
| 2,110,430 A | * | 3/1938 | Swanson | F25B 39/028 137/109 |
| 2,125,703 A | * | 8/1938 | Williams | F01N 13/102 165/154 |
| 2,377,001 A | * | 5/1945 | Graham | F16K 47/02 181/234 |
| 2,432,736 A | * | 12/1947 | Elkins | A24F 25/02 239/55 |
| 3,135,290 A | * | 6/1964 | Carls | F15B 13/0814 137/884 |

(Continued)

*Primary Examiner* — Umashankar Venkatesan
(74) *Attorney, Agent, or Firm* — Eldredge Law Firm, LLC; Richard Eldredge; Beth Felix

(57) ABSTRACT

A fluid manifold includes an elongated hollow body forming an inner area, having: a first end extending to a second end; and a top surface and a bottom surface; a cylindrical conduit having a length that extends through the inner area, the cylindrical conduit forming a channel that is fluidly separable from the inner area of the elongated hollow body, the cylindrical conduit extending through the first end of the elongated hollow body; a plurality of exit ports in fluid communication with the inner area and extending at a perpendicular angle relative to the cylindrical conduit; a mounting plate secured to the plurality of exit ports; a first row of a plurality of cutouts extending through the thickness of the elongated body, the first row of the plurality of cutouts providing fluid passage between the channel of the cylindrical conduit and the inner area of the elongated body; and a second row of a plurality of cutouts extending through the thickness of the elongated body, the second row of the plurality of cutouts providing fluid passage between the channel of the cylindrical conduit and the inner area of the elongated body.

2 Claims, 5 Drawing Sheets

(56) References Cited

U.S. PATENT DOCUMENTS

| | | | | | |
|---|---|---|---|---|---|
| 3,158,171 | A | * | 11/1964 | Eckert | B01D 3/008 137/262 |
| 3,347,473 | A | * | 10/1967 | Steck | B29C 31/041 137/599.04 |
| 3,623,367 | A | * | 11/1971 | Benedict | G01K 13/02 374/115 |
| 3,760,842 | A | * | 9/1973 | Mikiya | F16L 39/00 137/557 |
| 3,799,196 | A | * | 3/1974 | Scheitlin | F01N 13/102 137/561 A |
| 4,103,702 | A | * | 8/1978 | Duthion | F16K 3/26 137/375 |
| 5,040,380 | A | * | 8/1991 | Gregory | F25B 5/02 165/908 |
| 5,564,753 | A | * | 10/1996 | Juttelstad | F16L 39/005 285/120.1 |
| 8,469,059 | B1 | * | 6/2013 | Forst | F16K 11/0716 137/595 |
| 9,441,776 | B2 | * | 9/2016 | Byrne | F04B 11/0008 |
| 2002/0079003 | A1 | * | 6/2002 | Scampini | F16K 5/0407 137/625.32 |
| 2016/0230510 | A1 | * | 8/2016 | Micken | F04B 53/16 |

* cited by examiner

EQUALIZER MANIFOLD SYSTEM AND METHOD OF USE

BACKGROUND

1. Field of the Invention

The present invention relates generally to manifolds.

2. Description of Related Art

Fluid manifolds are well known in the art and are effective means to decrease fluid flowing from an input port to one or more exit ports. Although great strides have been in the field of fluid manifolds, many shortcomings exist.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
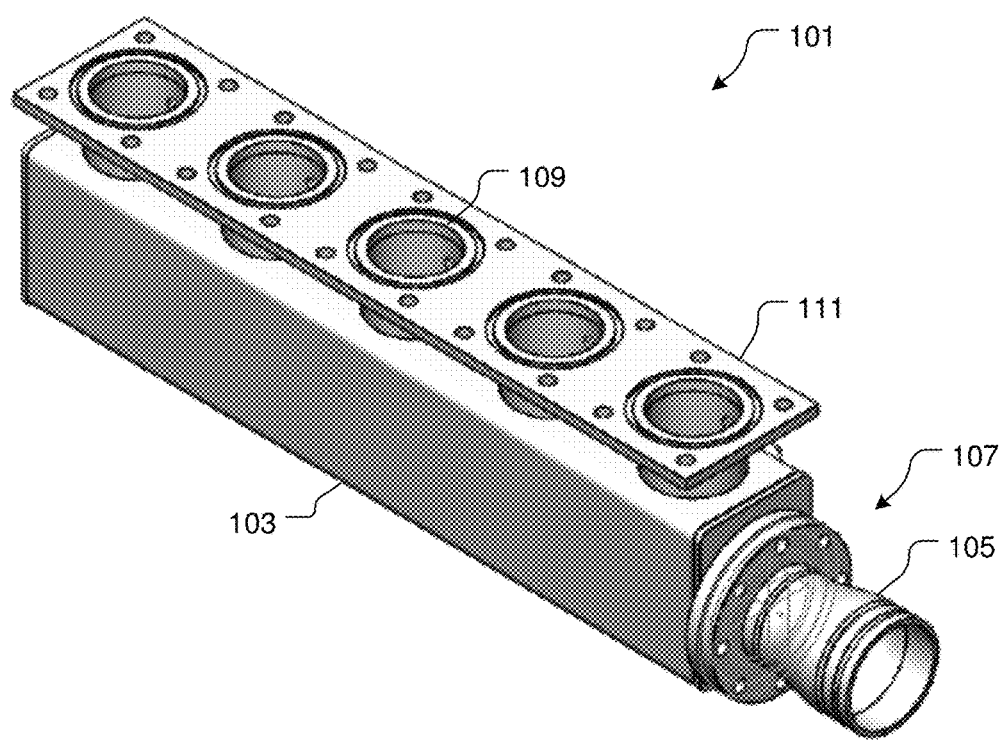
FIG. 1 is an oblique view of the manifold system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-8 depict various views of a manifold system 101 and method of use in accordance with a preferred embodiment of the present application. It will be appreciated that system 101 overcomes one or more problems commonly associated with the conventional manifolds.

In the contemplated embodiment, system 101 includes one or more of an elongated hollow housing 103 having an interior cavity 201, an elongated cylindrical conduit 105 configured to fit within the interior cavity 201 and extending the length of the housing 103 and configured to removably engage with the housing 103 via a flange 107, a plurality of exit ports 109 in fluid communication with the interior cavity 201, and a mounting plate 111 secured to the exit ports 109.

Figure 2:
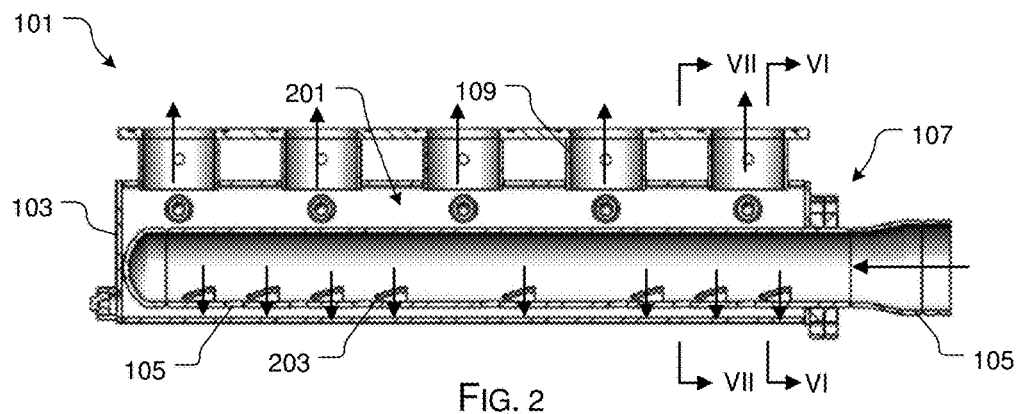
FIG. 2 is a cross-sectional view of the manifold system of FIG. 1.
Figure 3:
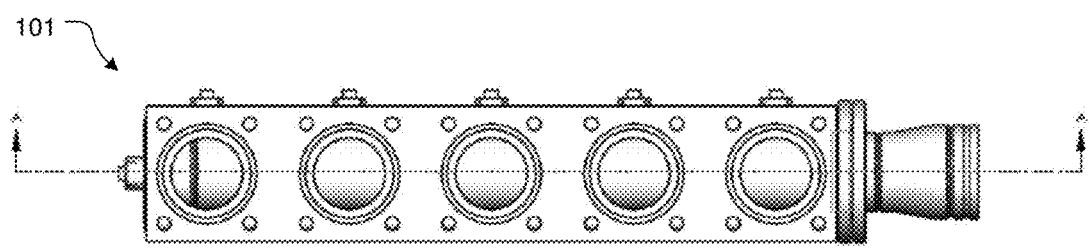
FIG. 3 is a top view of the manifold system of FIG. 1.
Figure 4:
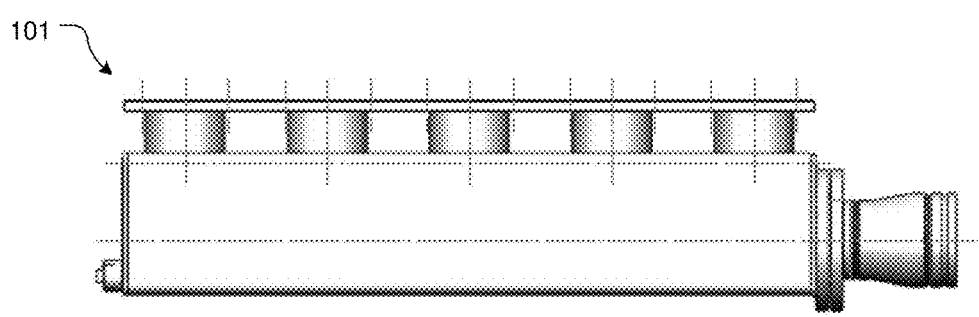
FIG. 4 is a side view of the manifold system of FIG. 1.
Figure 5:
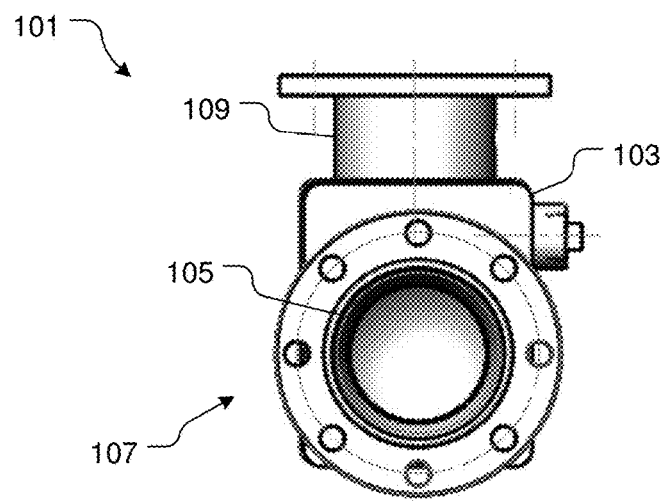
FIG. 5 is a front view of the manifold system of FIG. 1.

During use, fluid and material travels through conduit 105, through interior cavity 201, and exits through ports 109, as depicted with a plurality of arrow in at least FIG. 2. To achieve this feature, conduit 105 includes a plurality of cutouts 203 that extend through the thickness of the conduit 109 and provide fluid passage to the inner cavity 201.

Figure 6:
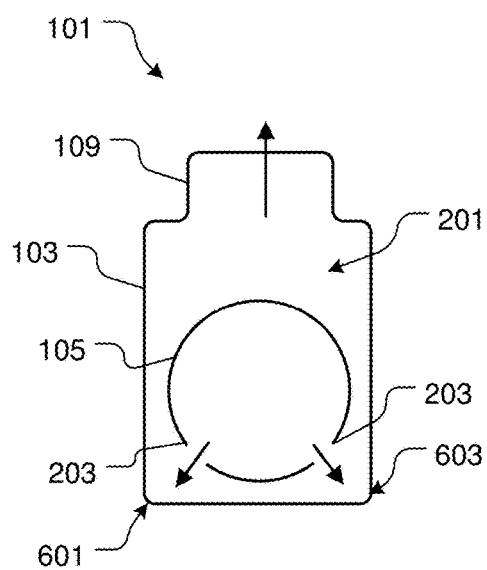
FIGS. 6 and 7 are cross-sectional views of the manifold system of FIG. 1.
Figure 7:
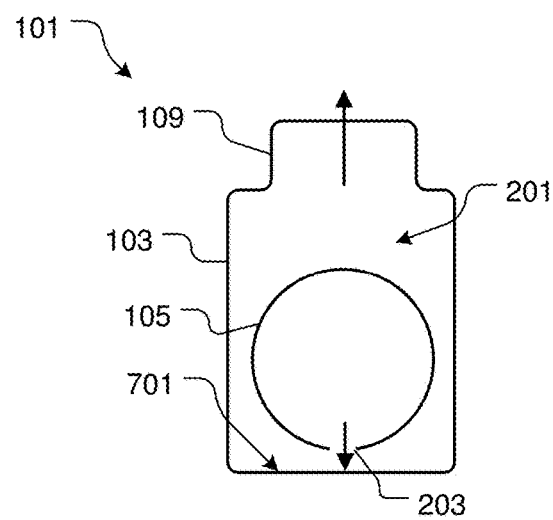
Figure 8:
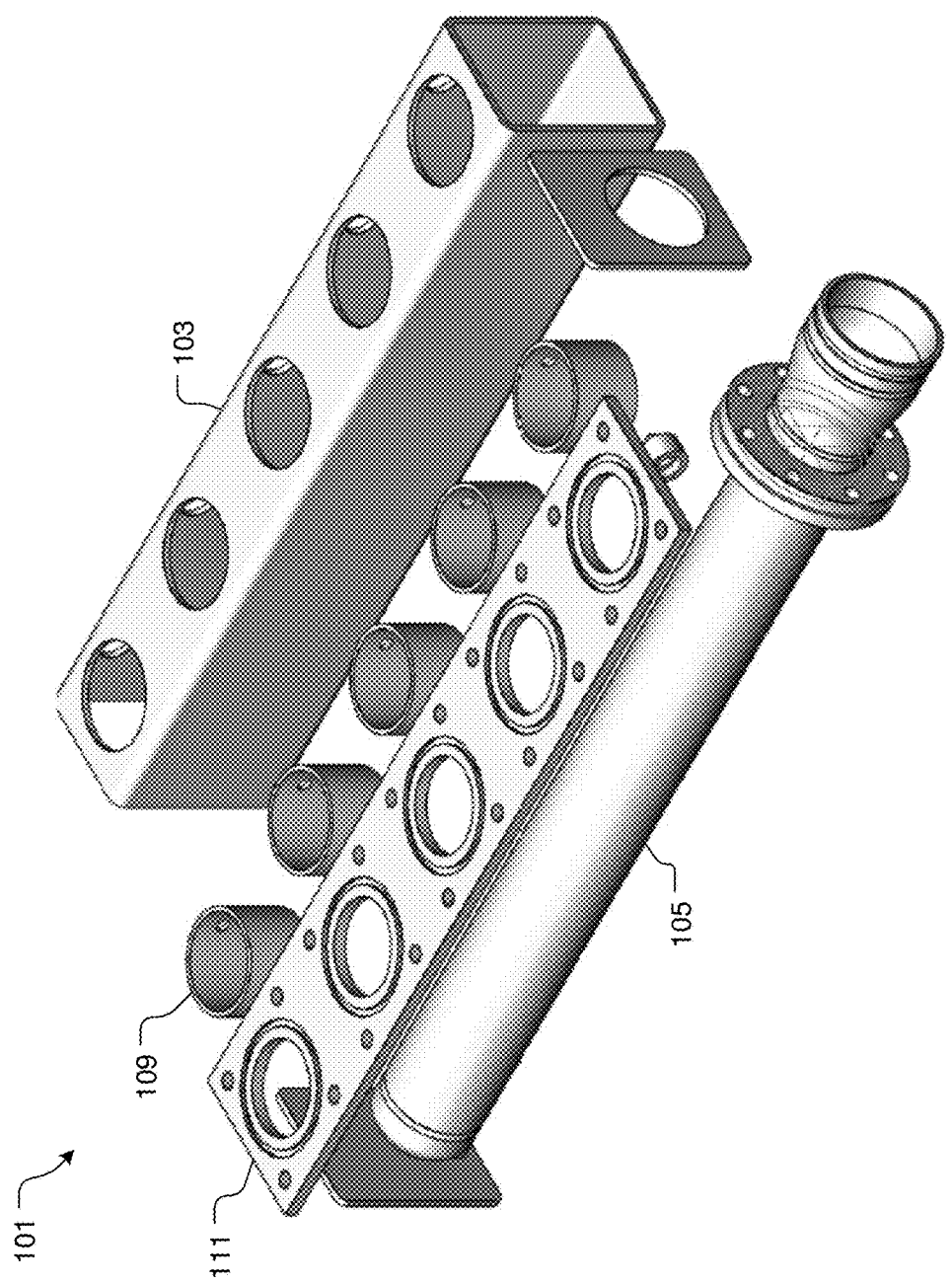
FIG. 8 is an exploded view of the manifold system of FIG. 1.

As shown in FIGS. 6 and 7, the cutouts are spaced oriented such that fluid is directed to the bottom corners 601, 603 of housing 103. In the same embodiment, the cutouts could also be oriented towards the bottom surface 701 of housing 103. These features ensure efficient mixing within inner cavity 201 prior to leaving the exit ports.

Figures 9, 10:
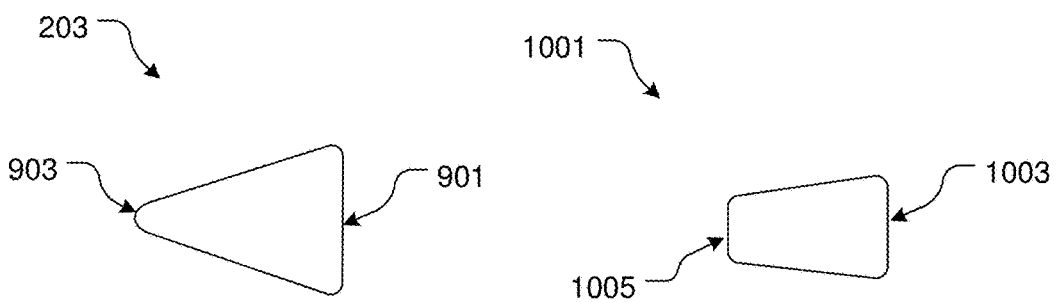
FIGS. 9-12 are cutouts of the manifold system of the FIG. 1.
Figures 11, 12:
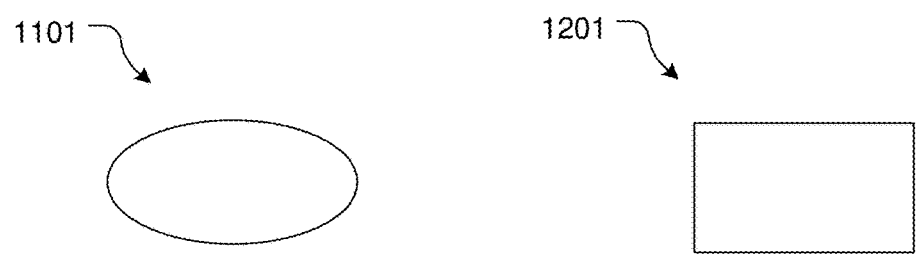

Referring now to FIGS. 9-12, various views of the type of cutouts are shown. In FIG. 9, the preferred embodiment is shown having a triangular shape with rounded corners and a greater length along edge 901 than edge 903. In the preferred embodiment, edge 901, e.g., the base, is positioned in direct flow with incoming fluid channeled through the conduit. Cutout 1001 is substantially similar to cutout 203, wherein cutout 1001 includes a first end 1003 larger than a second end 1005.

It will be appreciated that other shapes are also contemplated as cutouts as shown with cutouts 1101 and 1201.

One of the unique features believed characteristic of the present invention is the ability to slow the fluid passing through the conduit via a plurality of cutouts and to create a turbulent flow within the inner cavity of the housing.

The triangular shapes of the cutouts with the rounded corners has shown to be a preferred design and provides efficient means to create turbulent mixing.

Another unique feature is the ability to remove the conduit from the housing during maintenance via the flange.

In the preferred embodiment, the system is utilized in the oilfield industry; however, it will be appreciated that the manifold could be utilized in different industries.

This manifold is primarily designed as a low pressure, steady volume supply for a high pressure pump. The standard fluid supply is achieved through the use of a centrifugal pump. Capped at one end, with entry coming from the opposite side, allows for one flow direction. The manifold is comprised of an outer shell with an inner tube providing the flow. The inner tube acts as a static mixer by creating flow pressure through cutout exit ports into the outer tube. The combination of flow and low pressure flowing out of the inner tube through these cutouts, at an angle to the outer tubes bottom corners, creates a natural agitation of the fluid and the suspended materials added to it. The manifold feeds 5 or 3 suction ports through ports leaving the outer tube at the top. These pull fluid at intervals much the same way an internal combustion engine fires, in a repeated order. The goal is to provide consistent pressure and properly mixed solution to each suction port. The cutouts in the inner tube have been sized, spaced and tested for providing the proper flow, mix, and pressure to each one of these. The typical fluid solution is a mixture of water, sand, and a variety of chemicals to include, depending on the application, acids, soaps, water, sand, nitrogen, and others. The inner tube is held in place within the outer tube using a standard pipe flange welded to the inner tube and mating with the matching flange welded permanently to the outer tube. This allow for flow 360 degrees within the outer tube. As the mixture is agitated down into the corner of the outer tube through the cutout exit ports on the inner tube, the mix is swirled up and creates a constant flow mixture within the outer tube chamber, and up towards the suction ports leading out of the manifold and into the pump. The result of the design is in summary a more consistent mix, even pressure and equal flow to all suction ports as the pump pulls the mixture. This will allow for a more even wear of the pump parts and less pressure fluctuations between ports. The pump will require less service, and the manifold design will allow the high pressure fluid leaving the main pump to be a much more reliable mix. In the event that the outer or inner tube reaches the end of its effectiveness due to wear, the flanged connection will allow them to be replaced independent of one another, as opposed to replacing the entire manifold as is currently the industry standard for this application. This manifold provides better flow ratio, as well as a more even mix of medium and allows the user to purchase only the parts damaged as opposed to a complete unit.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A fluid manifold, comprising:
   an elongated hollow body forming an inner area, having:
      a first end extending to a second end; and
      a top surface and a bottom surface;
   a cylindrical conduit having a length that extends through the inner area, the cylindrical conduit forming a channel that is fluidly separable from the inner area of the elongated hollow body, the cylindrical conduit extending through the first end of the elongated hollow body;
   a plurality of exit ports in fluid communication with the inner area and extending at a perpendicular angle relative to the cylindrical conduit;
   a mounting plate secured to the plurality of exit ports;
   a first row of a plurality of cutouts extending through the thickness of the elongated body, the first row of the plurality of cutouts providing fluid passage between the channel of the cylindrical conduit and the inner area of the elongated body; and
   a second row of a plurality of cutouts extending through the thickness of the elongated body, the second row of the plurality of cutouts providing fluid passage between the channel of the cylindrical conduit and the inner area of the elongated body;
   wherein the second row of the plurality of cutouts are offset from the first row of the plurality of cutouts;
   wherein the second row of the plurality of cutouts are disposed between the first row of the plurality of cutouts; and
   wherein the first row of the plurality of cutouts are triangular in shape.

2. The manifold of claim 1, wherein a base of the triangular shaped plurality of cutouts is positioned in direct flow with incoming fluid channeled through cylindrical conduit.